(12) United States Patent
Nakazato (10) Patent No.: US 11,328,473 B2
(45) Date of Patent: May 10, 2022

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yusuke Nakazato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/865,858

(22) Filed: May 4, 2020

(65) Prior Publication Data
US 2020/0265634 A1 Aug. 20, 2020

Related U.S. Application Data

(63) Continuation of application No. PCT/JP2018/041584, filed on Nov. 9, 2018.

(30) Foreign Application Priority Data

Nov. 13, 2017 (JP) .............................. JP2017-218463

(51) Int. Cl.
*G06T 15/20* (2011.01)
*G06T 7/70* (2017.01)
*H04N 5/247* (2006.01)

(52) U.S. Cl.
CPC .............. *G06T 15/20* (2013.01); *G06T 7/70* (2017.01); *H04N 5/247* (2013.01); *G06T 2207/30244* (2013.01)

(58) Field of Classification Search
None
See application file for complete search history.

(56) References Cited

U.S. PATENT DOCUMENTS 10,108,882 B1 * 10/2018 Cheriyadat ........ G06K 9/00704
2019/0012804 A1 * 1/2019 Wang .................... G06T 3/4038

FOREIGN PATENT DOCUMENTS

JP    2011-151666 A    8/2011
JP    2011-228845 A    11/2011
(Continued)

OTHER PUBLICATIONS

Sayaka Sakamoto, et al., "Optimization of Camera Parameters in Volume Intersection", The transactions of the Institute of Electrical Engineers of Japan. C, A publication of Electronics, Information and System Society, Oct. 1, 2005, vol. 125, No. 7, pp. 1024-1029.

(Continued)

*Primary Examiner* — Frank S Chen
(74) *Attorney, Agent, or Firm* — Canon U.S.A., Inc. IP Division (57) ABSTRACT

An information processing apparatus obtains constraint information representing constraints in placing a plurality of image capturing apparatuses that capture images for generating a virtual viewpoint image, obtains placement information based on the obtained constraint information and relating to placement of the plurality of image capturing apparatuses, and outputs the obtained placement information of the plurality of image capturing apparatuses.

17 Claims, 7 Drawing Sheets

(56) References Cited

FOREIGN PATENT DOCUMENTS

JP         2014-215828 A        11/2014
JP         2017-194935 A        10/2017

OTHER PUBLICATIONS

"Kazui Ebisawa, et al., ""H-016 Optimization of Camera Alignment for Volume Intersection (3-dimensional processing and stereo, H section: Understanding of image recognition and media)""", The transactions of Forum on Information Technology, vol. 11, No. 3, operation committee of FIT (IEICE and IPSJ), Sep. 4, 2012, pp. 151-154".

* cited by examiner

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/041584, filed Nov. 9, 2018, which claims the benefit of Japanese Patent Application No. 2017-218463, filed Nov. 13, 2017, both of which are hereby incorporated by reference herein in their entirety.

BACKGROUND

Field

The present disclosure relates to an information processing apparatus, an information processing method, and a non-transitory computer-readable storage medium.

Background Art

Attention has been given to techniques in which, by using a plurality of viewpoint images of an object captured from multiple viewpoints by a plurality of image capturing apparatuses installed at different positions, a virtual viewpoint image or three-dimensional model which allows any changes in viewpoints is generated, as well as images captured from the positions at which the image capturing apparatuses are installed. With a technique that generates a virtual viewpoint image from a plurality of viewpoint images, for example, highlight scenes of a soccer or basketball game can be viewed from various angles. Patent Literature 1 (PTL1) discloses a technique in which, by using images of the same area captured by a plurality of image capturing apparatuses placed around this area, a virtual viewpoint image is generated and displayed as specified.

CITATION LIST

Patent Literature

PTL 1 Japanese Patent Laid-Open No. 2014-215828

The quality of a virtual viewpoint image generated from a plurality of viewpoint images varies depending on, for example, the placement of image capturing apparatuses, the position or shape of an object, and the positions and orientations of virtual viewpoints. It requires trial and error and lots of effort to determine the appropriate placement of a plurality of image capturing apparatuses for generating a high-quality virtual viewpoint image by taking into account, for example, the physical constraints of a site where the image capturing apparatuses are to be installed, the position or shape of the object, and the positions and orientations of virtual viewpoints.

SUMMARY

An information processing apparatus according to the present disclosure outputs appropriate placement information of a plurality of image capturing apparatuses to be used to generate a virtual viewpoint image. The information processing apparatus includes a constraint-information obtaining unit configured to obtain constraint information representing constraints in placing a plurality of image capturing apparatuses that capture images for generating a virtual viewpoint image; a placement-information unit configured to obtain placement information relating to placement of the plurality of image capturing apparatuses, the placement information being based on information obtained by the constraint-information obtaining unit; and an output unit configured to output the placement information of the plurality of image capturing apparatuses obtained by the placement-information obtaining unit.

Further features of the present disclosure will become apparent from the following description of exemplary embodiments with reference to the attached drawings.

DESCRIPTION OF THE EMBODIMENTS

Hereinafter, embodiments of the present disclosure will be described on the basis of the drawings. In the embodiments to be described, the term "image" includes the concepts of both video and still images, unless otherwise stated. That is, an information processing apparatus 100 according to the present embodiment is capable of processing either still or video images.

First Embodiment

A first embodiment of the present disclosure will now be described. In the first embodiment, description is given regarding an example where the information processing apparatus determines optimum placement of image capturing apparatuses such that a high-quality virtual viewpoint image can be obtained, and presents the determined placement information of image capturing apparatuses to the user (installer). In the first embodiment, placement information relating to the placement of a plurality of image capturing apparatuses includes information about positions and orientations in which the image capturing apparatuses are installed.

A description will now be given of how the information processing apparatus according to the present embodiment is configured.

<Hardware Configuration>

Figure 1:
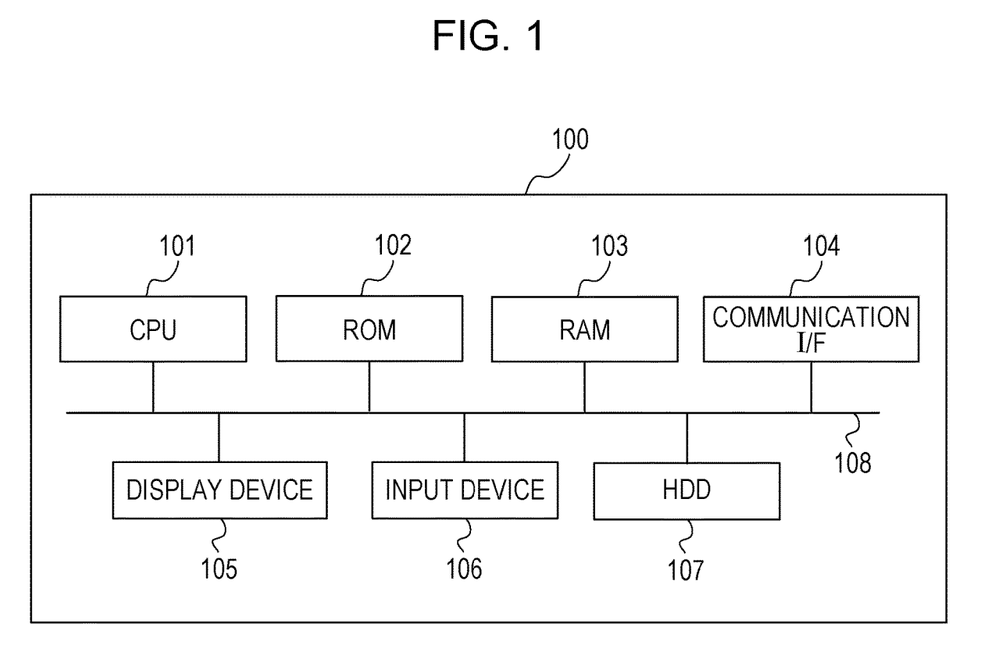
FIG. 1 is a diagram illustrating an exemplary hardware configuration of an information processing apparatus according to the present embodiment.

FIG. 1 is a block diagram illustrating an exemplary hardware configuration of the information processing apparatus 100 according to the present embodiment. The information processing apparatus 100 includes, as a hardware configuration, a CPU 101, a ROM 102, a RAM 103, a communication interface (communication I/F) 104, a display device 105, an input device 106, and a hard disk drive (HDD) 107. The CPU 101, the ROM 102, the RAM 103, the communication I/F 104, the display device 105, the input device 106, and the HDD 107 are connected to be able to communicate with each other through a system bus 108.

The central processing unit (CPU) 101 controls various types of devices included in the information processing apparatus 100 and connected to the system bus 108. The read-only memory (ROM) 102 stores programs of a basic input output system (BIOS) and a boot program. The random-access memory (RAM) 103 is used as a main memory of the CPU 101. The communication I/F 104 connects the information processing apparatus 100 to a network and controls information communication through the network. The information processing apparatus 100 may be connected to the network by wired connection, wireless connection, or both wired and wireless connections.

The display device 105 displays a result of processing performed, for example, by the CPU 101. The input device 106 accepts inputs from the operator. Examples of the input device 106 include a contact sensor, a mouse, a keyboard, and a remote control. The HDD 107 stores programs of an operating system (OS) and programs of various applications running on the OS. The HDD 107 may be replaced by such a storage device as a solid state drive (SSD).

When the information processing apparatus 100 configured as described above is powered on, the CPU 101 loads, for example, a program of the OS from the HDD 107 into the RAM 103 in accordance with the boot program stored in the ROM 102. By executing processing in accordance with, for example, the program of the OS loaded in the RAM 103, the CPU 101 implements the function of the information processing apparatus 100. That is, when the CPU 101 of the information processing apparatus 100 executes processing on the basis of a program, the software configuration of the information processing apparatus 100 and processing of flowcharts (described below) are implemented.

<Software Configuration>

Figure 2:
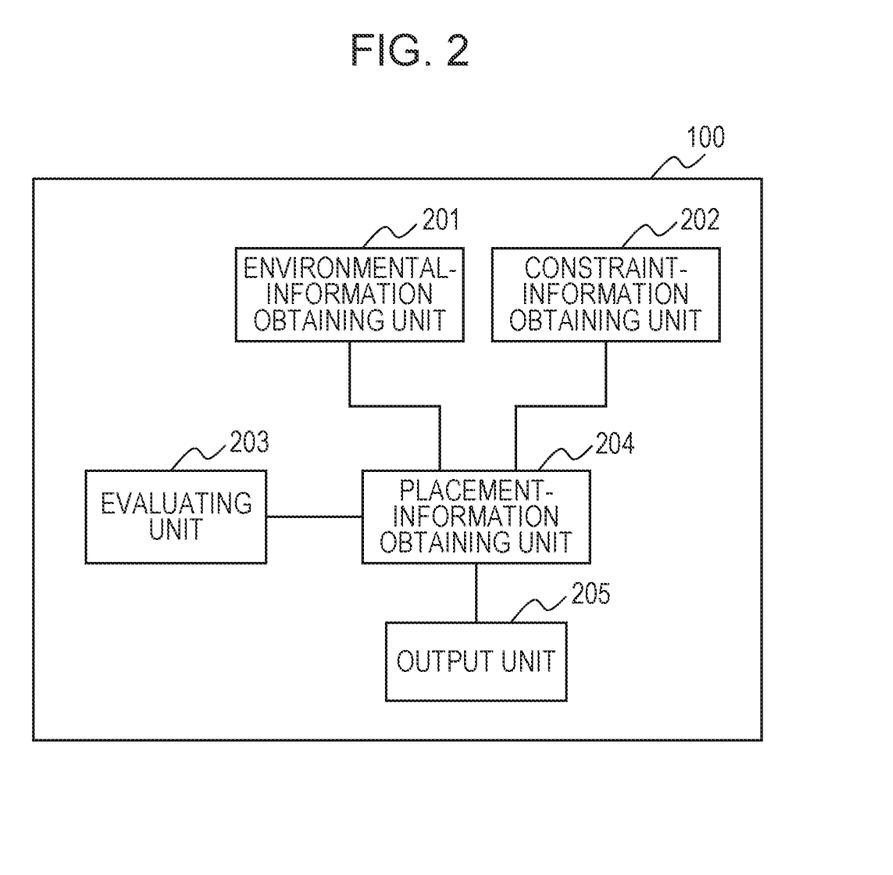
FIG. 2 is a diagram illustrating an exemplary software configuration of the information processing apparatus according to the present embodiment.

FIG. 2 is a block diagram illustrating an exemplary software configuration of the information processing apparatus 100 according to the present embodiment. The information processing apparatus 100 includes, as a software configuration, an environmental-information obtaining unit 201, a constraint-information obtaining unit 202, an evaluating unit 203, a placement-information obtaining unit 204, and an output unit 205.

The environmental-information obtaining unit 201 obtains environmental information of an object whose virtual viewpoint image is to be generated. The object in the present example includes two types, a static object and a dynamic object. The environmental-information obtaining unit 201 obtains, as environmental information of the object, three-dimensional information of a site (static object) and three-dimensional information and motion information of humans and other moving objects (dynamic object). The three-dimensional information includes three-dimensional shapes and textures.

The constraint-information obtaining unit 202 obtains constraint information representing constraints in placing image capturing apparatuses. In the present embodiment, the constraint-information obtaining unit 202 obtains, as the constraint information, the installable range and the number of image capturing apparatuses to be installed and the movement range of virtual viewpoints. The installable range of image capturing apparatuses represents the range of positions and orientations in which the image capturing apparatuses can be installed in the site (static object). The movement range of virtual viewpoints represents the possible range of positions and orientations of virtual viewpoints and angles of view in generating a virtual viewpoint image.

The evaluating unit 203 evaluates the placement information of image capturing apparatuses by evaluating the quality of the virtual viewpoint image generated. With the placement of image capturing apparatuses obtained by the placement-information obtaining unit 204, the evaluating unit 203 compares a virtual viewpoint image generated from simulation images simulating the images captured by the respective image capturing apparatuses, to a simulation image (correct image) from the same virtual viewpoints as those for the generated virtual viewpoint image, and calculates the evaluation value. The evaluation value is, for example, a peak signal-to-noise ratio (PSNR) calculated from a difference between the correct image and the generated virtual viewpoint image. The simulation image is generated on the basis of the environmental information obtained by the environmental-information obtaining unit 201. The virtual viewpoints for generating the virtual viewpoint image are randomly generated within the movement range of virtual viewpoints on the basis of the constraint information obtained by the constraint-information obtaining unit 202 and used.

The placement-information obtaining unit 204 obtains placement information relating to the placement of a plurality of image capturing apparatuses for capturing images of the object from multiple viewpoints. The placement information is based on the environmental information obtained by the environmental-information obtaining unit 201 and the constraint information obtained by the constraint-information obtaining unit 202. The placement-information obtaining unit 204 discretizes the space (placement parameter space) within the installable range of image capturing apparatuses and searches for the placement (positions and orientations) of image capturing apparatuses at which the evaluation value calculated by the evaluating unit 203 is highest, so as to obtain the placement information of image capturing apparatuses to be installed.

The output unit 205 outputs the placement information of image capturing apparatuses obtained by the placement-information obtaining unit 204, that is, the output unit 205 outputs information about the positions and orientations of the image capturing apparatuses to be installed. The output unit 205 outputs, on the basis of the result of evaluation made by the evaluating unit 203, the placement information of image capturing apparatuses obtained by the placement-information obtaining unit 204. The output unit 205 transmits the obtained placement information of image capturing apparatuses to, for example, an external output device connected to the information processing apparatus 100 in such a manner as to be able to communicate therewith. The output device that has received the placement information of image capturing apparatuses from the information processing apparatus 100 visualizes the received placement information of image capturing apparatuses and presents the visualized information to the user (installer). This allows the user (installer) to install a plurality of image capturing apparatuses in the calculated positions and orientations of the image capturing apparatuses.

Although the component elements illustrated in FIG. 2 have been described as the software configuration, all or some of the component elements illustrated in FIG. 2 may be implemented as a hardware configuration in the information processing apparatus 100. Examples of hardware in this case include an ASIC, an FPGA, and a GPU. The same applies to other embodiments described below.

Figure 3A:
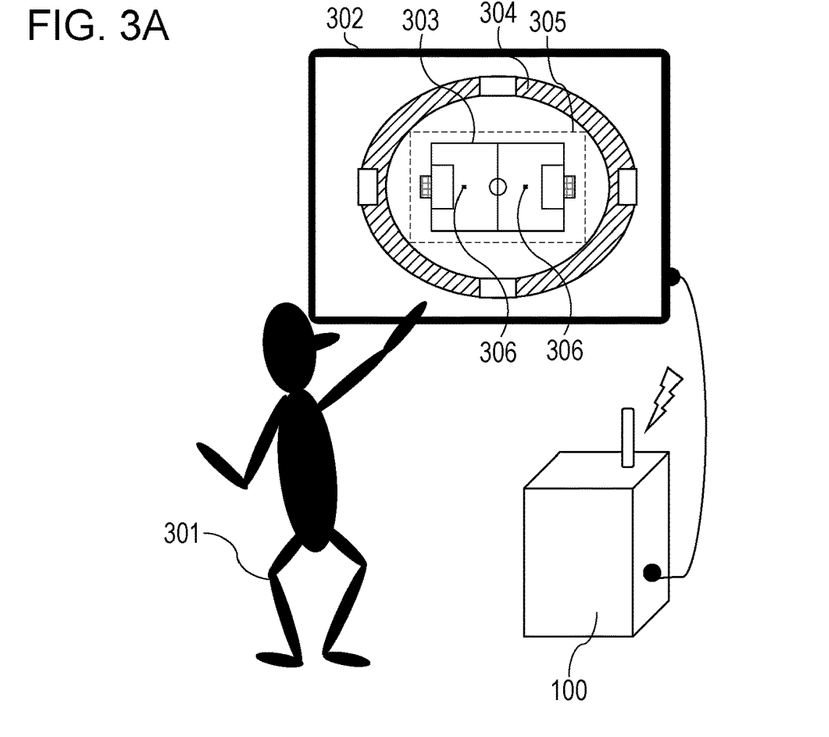
FIG. 3A is a diagram illustrating an exemplary installation operation support system according to the present embodiment.
Figure 3B:
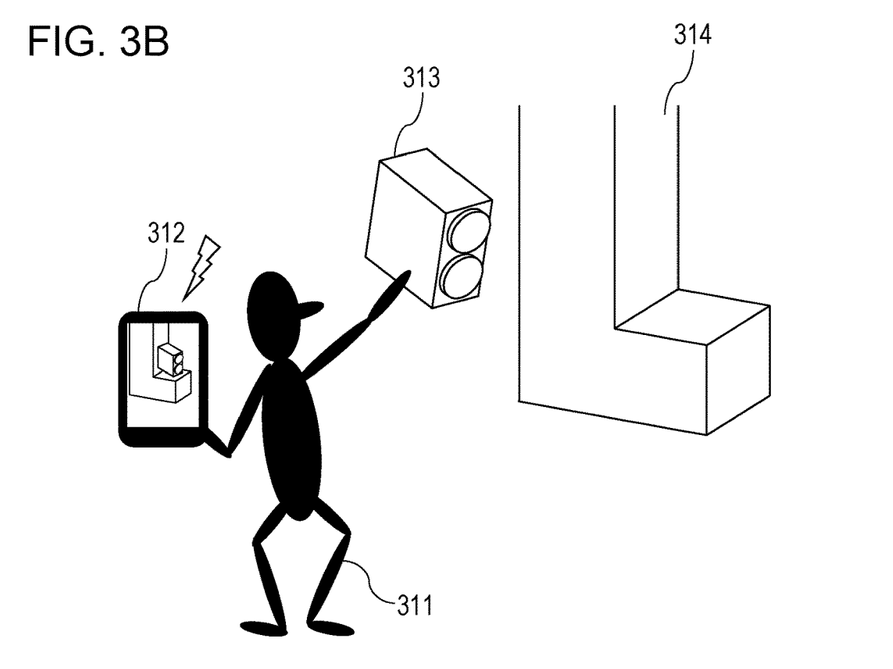
FIG. 3B is another diagram illustrating the exemplary installation operation support system according to the present embodiment.

An installation operation support system to which the information processing apparatus 100 of the present embodiment is applied will now be described. FIG. 3A and FIG. 3B are diagrams illustrating an exemplary installation operation support system according to the present embodiment. The installation operation support system illustrated in FIG. 3A and FIG. 3B determines the placement of a plurality of image capturing apparatuses for capturing images of an object from multiple viewpoints, provides the user (installer) with information about positions and orientations in which the image capturing apparatuses are to be installed, and thereby supports the installation of image capturing apparatuses carried out, for example, by the user.

As illustrated in FIG. 3A and FIG. 3B, the installation operation support system according to the present embodiment includes the information processing apparatus 100, an input and output device 302, and an output device 312. The information processing apparatus 100 obtains placement information of an image capturing apparatus on the basis of environmental information and constraint information. The information processing apparatus 100 transmits the obtained placement information of the image capturing apparatus to the output device 312. The image capturing apparatus is, for example, a camera. The input and output device 302 is a device for input and output of environmental information and constraint information. For example, the input and output device 302 is a display having a contact input function.

The output device 312 receives the placement information of the image capturing apparatus from the information processing apparatus 100, visualizes the received placement information of the image capturing apparatus, and presents the visualized information to a user (installer) 311. The output device 312 is, for example, a tablet computer having a wireless communication function. For example, on the basis of the received placement information of the image capturing apparatus, the environmental information, and the position and orientation of the output device 312, the output device 312 presents an installation simulation image of the image capturing apparatus using a virtual reality (VR) technique. The position and orientation of the output device 312 are obtained by a global positioning system (GPS) and a gyroscope sensor.

In the installation operation support system, a user 301 enters constraint information into environmental information 303 of an object for which a virtual viewpoint image displayed in the input and output device 302 is to be generated. The constraint information includes an installable range 304 of image capturing apparatuses, a movement range 305 of virtual viewpoints, and gaze points 306 of image capturing apparatuses. The gaze points 306 each represent a common position toward which the optical axes of a plurality of image capturing apparatuses are to be directed. The information processing apparatus 100 calculates the placement information of the image capturing apparatus to be installed, in accordance with instructions from the user 301. The information processing apparatus 100 then transmits the calculated placement information of the image capturing apparatus to the output device 312. After calculation of the placement information of the image capturing apparatus, the user (installer) 311 installs, on the basis of the received placement information of the image capturing apparatus, an image capturing apparatus 313 in an actual environment 314 in accordance with the position and orientation visualized and displayed in the output device 312. Thus, without having to go through a trial-and-error process in determining the placement of a plurality of image capturing apparatuses, the users 301 and 311 can install image capturing apparatuses in accordance with the placement information of image capturing apparatuses obtained by the information processing apparatus 100. It is thus possible to improve efficiency in the installation of a plurality of image capturing apparatuses to be used to generate a virtual viewpoint image.

Figure 4:
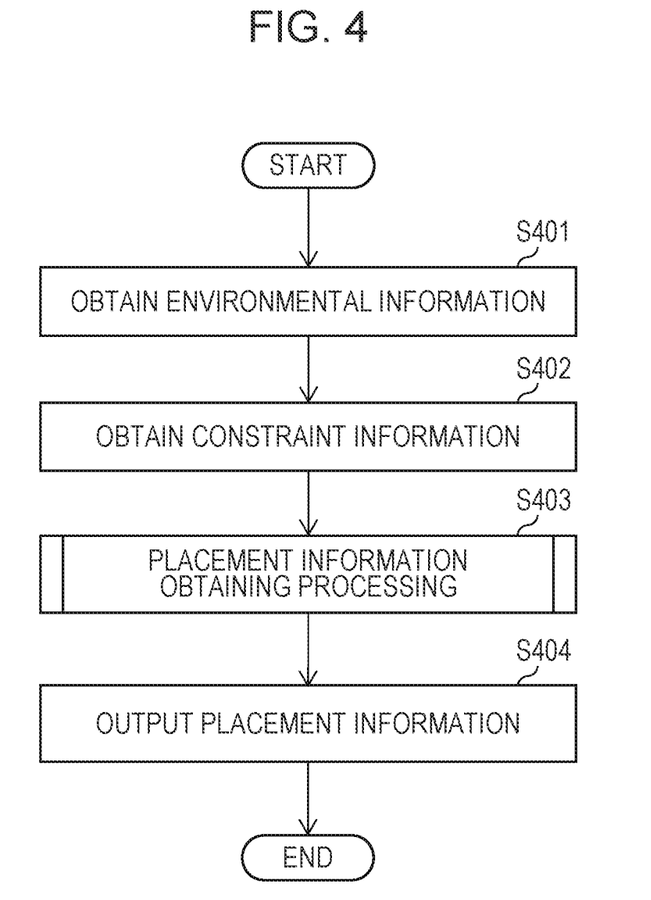
FIG. 4 is a flowchart illustrating an example of information processing in an information processing apparatus according to a first embodiment.

Information processing will now be described, in which the information processing apparatus 100 according to the first embodiment determines the placement of image capturing apparatuses and outputs the placement information. FIG. 4 is a flowchart illustrating an example of information processing in the information processing apparatus 100 according to the first embodiment. The flowchart to be described is implemented when the CPU 101 illustrated in FIG. 1 reads various programs recorded in the ROM 102 or the HDD 107 and executes control of each part. At least some steps of the flowchart described below may be executed by dedicated hardware. The dedicated hardware is, for example, ASIC, FPGA, or GPU.

In step S401, the environmental-information obtaining unit 201 obtains, as environmental information, three-dimensional information of a static object and three-dimensional information and motion information of a dynamic object.

In step S402, the constraint-information obtaining unit 202 obtains, as constraint information, the installable range and the number of image capturing apparatuses to be installed and the movement range of virtual viewpoints.

In step S403, on the basis of the environmental information and the constraint information obtained in steps S401 and S402, the placement-information obtaining unit 204 performs placement information obtaining processing that obtains placement information relating to the placement of a plurality of image capturing apparatuses. In the placement information obtaining processing performed in step S403, the placement-information obtaining unit 204 obtains, on the basis of the environmental information and the constraint information, placement information of a plurality of image capturing apparatuses, that is, information representing the positions and orientations of the image capturing apparatuses to be installed. The details of the placement information obtaining processing in step S403 will be described later on below with reference to FIG. 5.

In step S404, the output unit 205 transmits, to an output device, the placement information of image capturing apparatuses (i.e., information about the positions and orientations of the image capturing apparatuses to be installed) obtained in step S403. The output device visualizes the received placement information of image capturing apparatuses and presents the visualized information to the user (installer).

Figure 5:
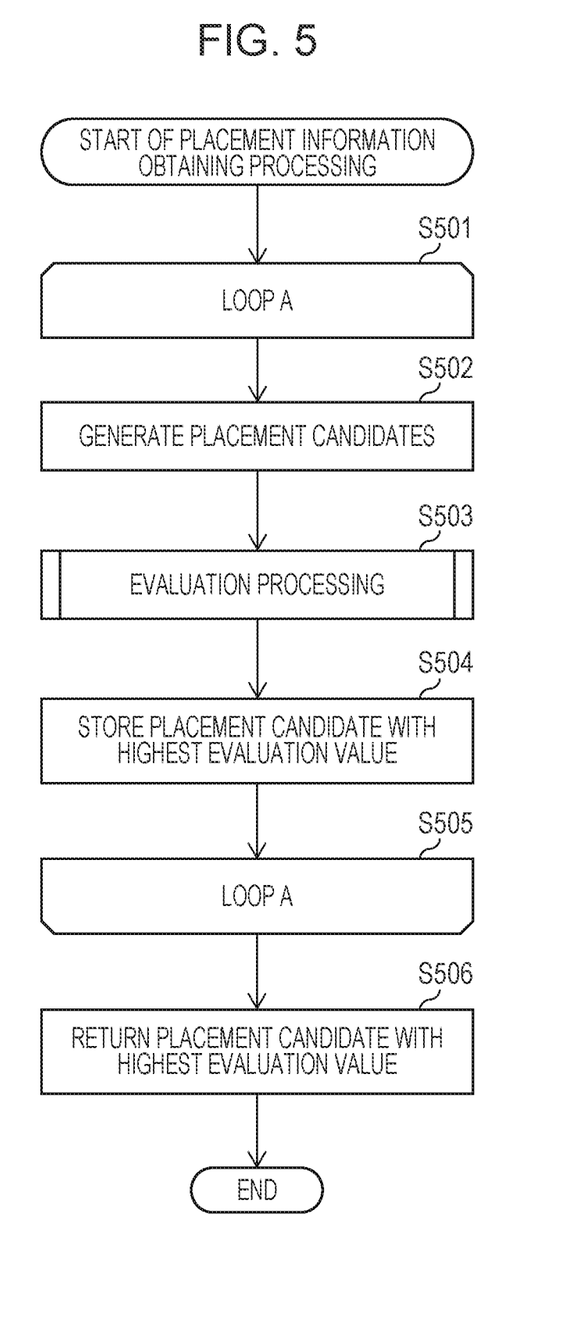
FIG. 5 is a flowchart illustrating an example of placement information obtaining processing according to the first embodiment.

The placement information obtaining processing in step S403 shown in FIG. 4 will now be described with reference to FIG. 5. FIG. 5 is a flowchart illustrating an example of the placement information obtaining processing according to the first embodiment.

Upon start of the placement information obtaining processing, the process proceeds to step S501, and the placement-information obtaining unit 204 repeatedly executes the processing in steps S501 to S505 (loop A) a predetermined number of times.

In step S502, the placement-information obtaining unit 204 generates a plurality of placement candidates for a plurality of image capturing apparatuses. Specifically, the placement-information obtaining unit 204 discretizes the space (placement parameter space) within the installable range of image capturing apparatuses and generates combinations of placement parameters (positions and orientations) as placement candidates. The number of elements in the combinations of placement parameters is the same as the number of image capturing apparatuses to be installed, obtained as constraint information in step S402. The placement-information obtaining unit 204 coarsely discretizes the placement parameter space in the initial iteration of the loop A from steps S501 to S505. Then, in every iteration of the loop A, the placement-information obtaining unit 204 more finely discretizes a placement parameter space close to the combination of placement parameters with a high evaluation value. Thus, in the placement information obtaining processing, the placement parameter space for generating placement candidates is made finer in every execution of the loop A, so as to carry out a coarse-to-fine search for the optimum combination of placement parameters.

In step S503, the evaluating unit 203 performs evaluation processing which evaluates the quality of a virtual viewpoint image generated with each of the placement candidates generated in step S502, so as to evaluate the placement of image capturing apparatuses. In the evaluation processing in step S503, the evaluating unit 203 evaluates the quality of a virtual viewpoint image generated with each of the placement candidates generated in step S502 and calculates the evaluation value. The details of the evaluation processing in step S503 will be described later on below with reference to FIG. 6.

In step S504, of the plurality of placement candidates generated in step S502, a placement candidate for which the evaluation value calculated in step S503 is highest is stored by the placement-information obtaining unit 204. If the number of executions of the loop A has not reached a predetermined value, the placement-information obtaining unit 204 further generates a plurality of placement candidates for the plurality of image capturing apparatuses on the basis of the placement candidate stored in step S504, and executes the processing in the loop A again.

If the number of executions of the loop A reaches the predetermined value, the process proceeds to step S506. In step S506, the placement-information obtaining unit 204 returns, as the placement information of image capturing apparatuses, the placement candidate for which the evaluation value stored in step S504 is highest, and then ends the placement information obtaining processing. The placement information of image capturing apparatuses is output by the output unit 205 in step S404.

Figure 6:
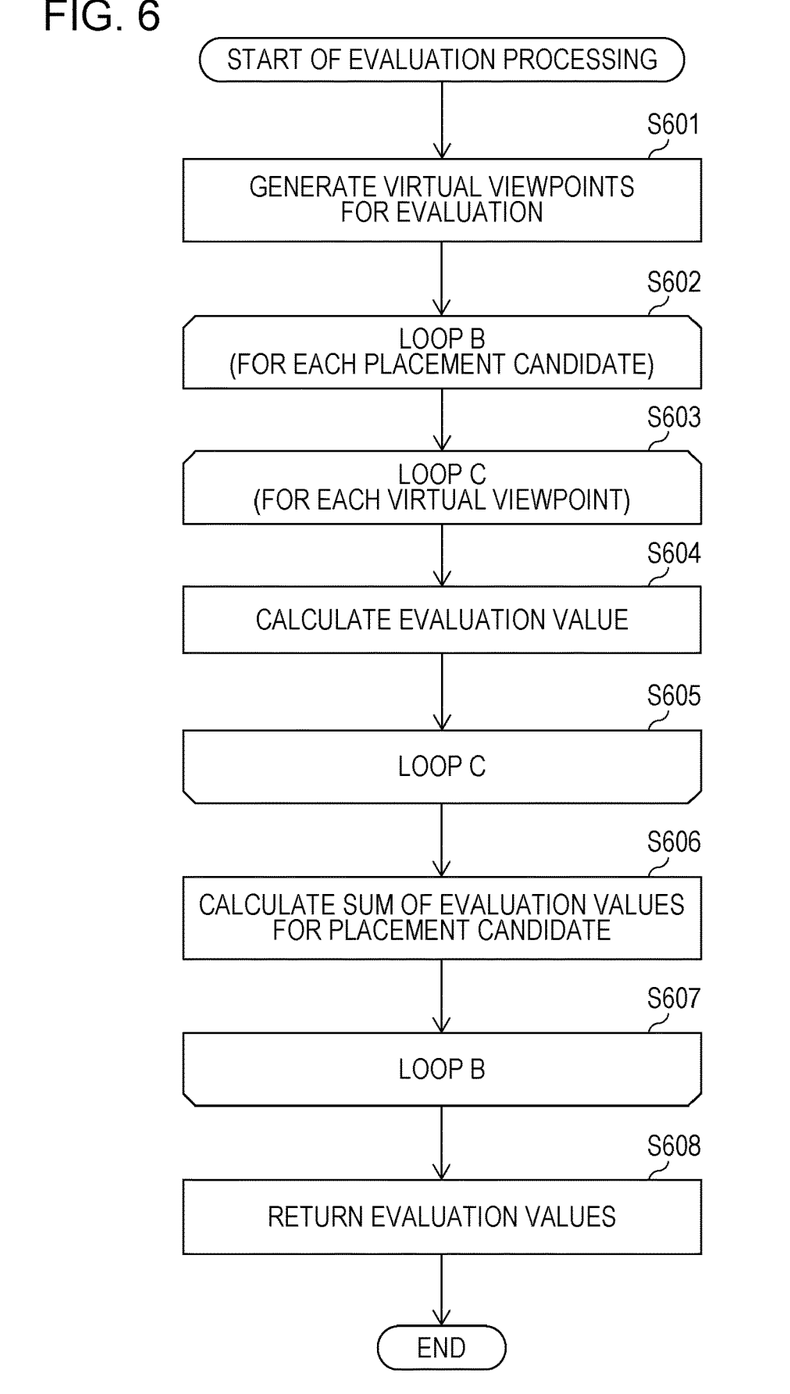
FIG. 6 is a flowchart illustrating an example of evaluation processing according to the first embodiment.

The evaluation processing in step S503, shown in FIG. 5, will now be described with reference to FIG. 6. FIG. 6 is a flowchart illustrating an example of the evaluation processing according to the first embodiment.

In step S601, the evaluating unit 203 generates one or more virtual viewpoints for evaluation, on the basis of the constraint information obtained in step S402. Specifically, on the basis of the movement range of virtual viewpoints obtained as constraint information, the evaluating unit 203 randomly generates the positions and orientations of virtual viewpoints and the angles of view within the movement range of virtual viewpoints.

After the virtual viewpoints for evaluation are generated in step S601, the process proceeds to step S602, and the evaluating unit 203 executes processing in steps S602 to S607 (loop B) for each of the placement candidates generated in step S502. Upon completion of the processing in steps S602 to S607 for one placement candidate, the evaluating unit 203 selects, from the plurality of placement candidates generated, one placement candidate for which the processing in steps S602 to S607 has not been executed, and then executes the processing in steps S602 to S607 for the selected placement candidate. By repeating this operation, the evaluating unit 203 executes the processing in steps S602 to S607 (loop B) for all the placement candidates generated in step S502.

Upon start of the loop B for the placement candidates, the process proceeds to step S603, and the evaluating unit 203 executes processing in steps S603 to S605 (loop C) for each of the virtual viewpoints generated in step S601. Upon completion of the processing in steps S603 to S605 for one virtual viewpoint, the evaluating unit 203 selects, from the virtual viewpoints generated, one virtual viewpoint for which the processing in steps S603 to S605 has not been executed, and then executes the processing in steps S603 to S605 for the selected virtual viewpoint. By repeating this operation, the evaluating unit 203 executes the processing in steps S603 to S605 (loop C) for all the virtual viewpoints generated in step S601.

In step S604, the evaluating unit 203 calculates an evaluation value for the virtual viewpoint of interest from which a virtual viewpoint image is generated, with image capturing apparatuses installed in accordance with the placement candidate of interest. Of the plurality of placement candidates generated in step S502, the placement candidate of interest is a placement candidate for which the processing in steps S602 to S607 (loop B) is being executed. Also, of the virtual viewpoints generated in step S601, the virtual viewpoint of interest is a virtual viewpoint for which the processing in steps S603 to S605 (loop C) is being executed.

In the processing in step S604, the evaluating unit 203 generates simulation images (described below) on the basis of the three-dimensional information of the static object and the three-dimensional information and motion information of the dynamic object obtained as the environmental information in step S401. The evaluating unit 203 generates first simulation images simulating the images captured by image capturing apparatuses installed in accordance with the placement candidate of interest. Additionally, as a correct image for evaluation, the evaluating unit 203 generates a second simulation simulating the image captured from the virtual viewpoint of interest. Also, the evaluating unit 203 generates a virtual viewpoint image from the virtual viewpoint of interest using the first simulation images generated. The evaluating unit 203 then calculates a PSNR from the virtual viewpoint image and the correct image generated, and defines the calculated PSNR as the evaluation value for the quality of the generated virtual viewpoint image.

The method used by the evaluating unit 203 to generate a virtual viewpoint image may be any method that can reproduce a view from the virtual viewpoint, and any known technique for generating a virtual viewpoint image is applicable. For example, the method may be a model-based technique that carries out three-dimensional reconstruction of an object to reproduce a view from any viewpoint, or may be an image-based technique that carries out image deformation or composition to reproduce a view from any viewpoint.

After completion of the processing in steps S603 to S605 (loop C) for all the virtual viewpoints generated in step S601, the process proceeds to step S606. In step S606, the evaluating unit 203 determines the sum of the evaluation values for the respective virtual viewpoints and defines the sum as the evaluation value for the placement candidate of interest.

After completion of the processing in steps S602 to S607 (loop B) for all the placement candidates generated in step S502, the process proceeds to step S608. In step S608, the evaluating unit 203 returns the evaluation values for the respective placement candidates obtained in step S606 and ends the evaluation processing.

The first embodiment makes it possible to output appropriate placement information of a plurality of image capturing apparatuses to be used to generate a virtual viewpoint image. Also, by providing the user (installer) with the placement information of image capturing apparatuses, the user can install a plurality of image capturing apparatuses in accordance with appropriate placement, without going through a trial-and-error process in determining the placement. This improves efficiency of the installation operation and reduces the time required for the installation operation.

Cameras, which have been described as exemplary image capturing apparatuses in the present embodiment, may be either color or monochrome cameras. The image capturing apparatuses may be RGB-D cameras, three-dimensional measurement apparatuses, or any apparatuses capable of capturing an image of an object. Although the input and output device 302 has been described as a display having a contact input function, it may be, for example, a pen tablet or any device capable of being used to input environmental information and constraint information. The input function of the input and output device 302 may be implemented, for example, by a mouse, a keyboard, or a scanner. Although the output device 312 has been described as a tablet computer having a wireless communication function, it may be a PC with a display or printer, a smartphone, or any device capable of visualizing the placement information and presenting the visualized information to the user (installer). A virtual reality (VR) or augmented reality (AR) system with a head-mounted display (HMD) may be used.

The environmental information obtained by the environmental-information obtaining unit 201 is not limited to the examples described above, and may be computer graphics (CG), three-dimensional video produced by measuring a real object, or any information containing information necessary to generate an image used by the evaluating unit 203. The environmental information may be a captured image of an object. The environmental information is preferably content of the same type as an object to be captured, but may be different therefrom. Content serving as the environmental information preferably contains motion information, but does not necessarily need to do so, and may be a set of multiple scenes.

The constraint information obtained by the constraint-information obtaining unit 202 may include, for example, the resolution of image capturing apparatuses or virtual viewpoints, as well as the example described above. The installable range of image capturing apparatuses obtained as constraint information may be a set of discrete positions and orientations in which image capturing apparatuses can be installed. The movement range of virtual viewpoints obtained as constraint information may be a set of combinations of discrete positions and orientations of virtual viewpoints and angles of view. The constraint information may include parameters for image capturing, such as zoom values or regions of interest (ROIs). The gaze point positions may be obtained, so as to restrict the placement of image capturing apparatuses such that the image capturing apparatuses look at predetermined positions.

The evaluating unit 203 may be of any type that is capable of evaluating the placement of image capturing apparatuses and calculating the evaluation value. In the present embodiment, the evaluating unit 203 compares a virtual viewpoint image generated from simulation images simulating the images captured by the respective image capturing apparatuses, to a simulation image (correct image) from the same virtual viewpoints as those for the generated virtual viewpoint image, and then calculates a PSNR as the evaluation value. The evaluation value is not limited to a PSNR, and may be a mean square error (MSE) value, a structure similarity (SSIM) value, or any evaluation value used to evaluate image quality. Instead of comparison with the correct image, comparison with an image generated in the preceding frame may be made to determine the evaluation value. For example, a statistic (such as a mean or variance) of the difference between the motion of feature points predicted from the motion of the image capturing apparatuses or object from the preceding frame and the motion of feature points actually detected from a generated image, may be used as the evaluation value. Also, instead of a simulation image generated on the basis of environmental information, an image actually captured may be obtained and used as environmental information.

In the present embodiment, virtual viewpoints for evaluation are randomly generated within the movement range of virtual viewpoints obtained as constraint information, but they may be of any type as long as they are parameters for generating images from virtual viewpoints. In addition to the positions and orientations of virtual viewpoints, such parameters as angles of view, zoom values, focal lengths, and resolutions may be included. The virtual viewpoints do not necessarily need to be randomly generated within the movement range of virtual viewpoints and may be uniformly generated at regular intervals, or virtual viewpoints that have been used to generate a virtual viewpoint image may be stored and used later on.

The evaluating unit 203 may evaluate the placement of image capturing apparatuses on the basis of accuracy of a generated three-dimensional shape, without generating a virtual viewpoint image. A three-dimensional shape (reference model) used in simulation and a three-dimensional shape (generated model) reconstructed from images simulating the images from a plurality of image capturing apparatuses may be compared to calculate an evaluation value and evaluate the placement of image capturing apparatuses suitable for three-dimensional reconstruction. The evaluation value for comparing the three-dimensional shapes may be any evaluation value that represents a difference in shape. For example, the closest points or planes in the reference model and the generated model may be associated with each other and a statistic, such as the mean value, of distances between the corresponding points or planes may be used as the evaluation value. Colors assigned to the three-dimensional shapes may also be taken into account so that a statistic, such as the mean value, of color differences between the corresponding points or planes in the reference model and the generated model can be added to the evaluation value. The weighted sum of the shape and color evaluation values may be used as the evaluation value. The comparison with the reference model does not necessarily need to be made, and the number of yet-to-be-measured surface voxels in the generated model may be used as the evaluation value. As in the case of generating a virtual viewpoint image, a statistic (such as a mean or variance) of the difference between the motion of three-dimensional feature points predicted from the motion of the image capturing apparatuses or object from the preceding frame and the motion of three-dimensional feature points detected from the generated model, may be used as the evaluation value.

The placement information of image capturing apparatuses obtained by the placement-information obtaining unit 204 may include not only the positions and orientations of the image capturing apparatuses, but also parameters for image capturing, such as angles of view, zoom values, and resolutions. In addition to the placement parameters, such as the positions and orientations and the angles of view, the placement information may include the permissible range of deviation (ambiguity) in positions and orientations. The permissible range of deviation may be obtained on the basis of the evaluation value for neighboring parameters of the obtained placement parameters, or may be obtained by any method that can obtain the permissible range. For example, if the result of comparison between the evaluation value for the obtained placement parameters and the evaluation value for the neighboring parameters is within a threshold, the neighboring parameters may be added to the permissible range, or the permissible range may be expanded to include the neighboring parameters. The distribution of evaluation values may be calculated from the evaluation value for the obtained placement parameters and the evaluation value for the neighboring parameters, so that on the basis of the distribution of evaluation values, the permissible range can be expanded to include the neighboring parameters having an evaluation value within a predetermined range.

In the present embodiment, the placement-information obtaining unit 204 searches for the placement of image capturing apparatuses with a highest evaluation value while changing the discreteness of the discretized space (placement parameter space) within the installable range of image capturing apparatuses in every iteration of the loop A. For faster searching, the image size during evaluation may be reduced when the discreteness is coarse, and the image size may be increased as the searching proceeds and the discreteness becomes finer. The searching may be carried out without changing the discreteness, or any parameter searching technique may be used. A parameter optimization technique, such as a genetic algorithm, simulated annealing, or a Gauss-Newton method, may be used. For example, as in the case of a particle filtering method, in the process of repeatedly calculating a placement parameter, placement candidates may be randomly generated not only in the vicinity of the calculated placement parameter, but also outside the vicinity of the calculated placement parameter, so as to avoid local solutions. The initial value of the placement parameter to be used in this case may be one that defines the angle of view such that the image capturing apparatuses are directed toward the gaze point and evenly spaced so as to have a common field of view. In addition to the placement parameter with the highest evaluation value, a plurality of placement parameters with high evaluation values may be retained.

The output unit 205 may be of any type that is capable of outputting the obtained placement information of image capturing apparatuses. As the placement information of image capturing apparatuses, for example, an image simulating the installation of image capturing apparatuses may be presented by the virtual reality technique, or an image simulating the installation may be synthesized into an actual image and presented by the augmented reality technique. The position and orientation of the output device necessary during the synthesis may be calculated from information obtained, for example, by a GPS sensor, a gyroscope sensor, a geomagnetic sensor, or a gravity sensor. The position of the output device may be calculated on the basis of radio wave information received from a wireless base station. The position and orientation of the output device may be calculated on the basis of markers or feature points extracted from an image obtained from an image capturing apparatus attached to the output device or a range image. The obtained placement information of image capturing apparatuses may be described in the drawing or shape model of a static object (e.g., site) and output on a display or paper, or may be output in the form of text describing the positions and orientations of installation. If the placement information of image capturing apparatuses includes the permissible range of deviation, the permissible range may be visualized and presented. For example, the permissible range of positional deviation may be assigned with a given color and superimposed on a simulation image, an actual image, or a drawing.

Second Embodiment

A second embodiment of the present disclosure will now be described. In the second embodiment, description is given regarding an example where the information processing apparatus determines, as the placement information of image capturing apparatuses, not only the positions and orientations of the image capturing apparatuses but also the number of image capturing apparatuses to be installed, and provides the user (installer) with the determined placement information of the image capturing apparatuses.

The configurations of the information processing apparatus and an installation operation support system according to the second embodiment differ from the configurations of the information processing apparatus and the installation operation support system according to the first embodiment in the following respects, and are otherwise the same as those of the first embodiment. For the configurations of the information processing apparatus and the installation operation support system according to the second embodiment, the description of the same component elements as in the first embodiment will be omitted.

In the information processing apparatus 100 according to the second embodiment, the constraint-information obtaining unit 202 obtains, as constraint information, not only the installable range of image capturing apparatuses and the movement range of virtual viewpoints, but also the maximum and minimum values of the number of image capturing apparatuses to be installed and the threshold of the evaluation value. On the basis of the environmental information and the constraint information, the placement-information obtaining unit 204 obtains placement information relating to the placement of a plurality of image capturing apparatuses. In the present embodiment, the placement-information obtaining unit 204 obtains, as placement information, not only the positions and orientations of image capturing apparatuses to be installed, but also the number of image capturing apparatuses to be installed. On the basis of the result of evaluation made by the evaluating unit 203, the output unit 205 outputs the placement information of image capturing apparatuses obtained by the placement-information obtaining unit 204, that is, information about the positions and orientations and the number of image capturing apparatuses to be installed.

Figure 7:
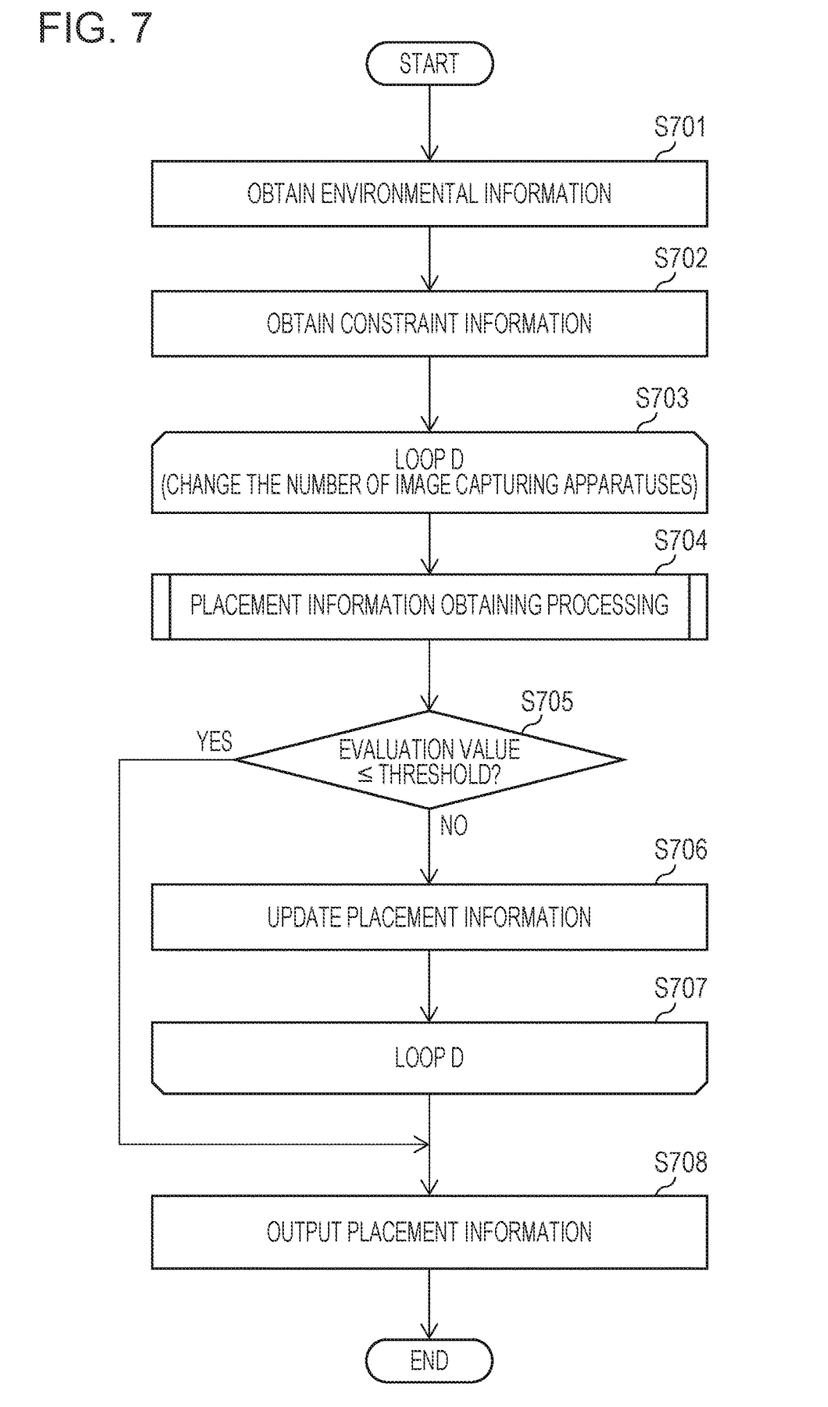
FIG. 7 is a flowchart illustrating an example of information processing in an information processing apparatus according to a second embodiment.

Information processing will now be described, in which the information processing apparatus 100 of the second embodiment obtains and outputs the placement information of image capturing apparatuses. FIG. 7 is a flowchart illustrating an example of information processing performed by the information processing apparatus 100 according to the second embodiment.

In step S701, the environmental-information obtaining unit 201 obtains, as environmental information, three-dimensional information of a static object and three-dimensional information and motion information of a dynamic object.

In step S702, the constraint-information obtaining unit 202 obtains, as constraint information, not only the installable range of image capturing apparatuses and the movement range of virtual viewpoints, but also the maximum and minimum values of the number of image capturing apparatuses to be installed and the threshold of the evaluation value.

Upon obtaining the environmental information and the constraint information, the process proceeds to step S703, where the placement-information obtaining unit 204 sets the number of image capturing apparatuses to be installed to the maximum value obtained in step S702 and executes the processing in steps S703 to S707 (loop D). The placement-information obtaining unit 204 then repeats the processing in steps S703 to S707 while reducing the number of image capturing apparatuses to be installed in decrements of one, from the maximum to minimum values obtained in step S702, in every execution of the processing in steps S703 to S707.

In step S704, on the basis of the environmental information and the constraint information obtained in steps S701 and S702, as in step S403 of the first embodiment, the placement-information obtaining unit 204 performs placement information obtaining processing, with the number of image capturing apparatuses to be installed set in step S703. In the placement information obtaining processing performed in step S704, the placement-information obtaining unit 204 obtains, on the basis of the environmental information and the constraint information, placement information of a set number of image capturing apparatuses to be installed, that is, the positions and orientations of the image capturing apparatuses to be installed and the evaluation value.

In step S705, the placement-information obtaining unit 204 determines whether the evaluation value calculated in step S704 is lower than or equal to the threshold of the evaluation value obtained in step S702. If the placement-information obtaining unit 204 determines that the calculated evaluation value is lower than or equal to the threshold, the process exits the repetition and proceeds to step S708, whereas if the placement-information obtaining unit 204 determines that the calculated evaluation value is higher than the threshold, the process proceeds to step S706.

In step S706, the placement-information obtaining unit 204 stores, as placement information of image capturing apparatuses, the obtained information about the positions and orientations and the number of image capturing apparatuses to be installed. Therefore, the placement information of image capturing apparatuses to be output when the process proceeds from step S705 to step S708 is one that has been obtained and stored in the previous iteration of the loop D, that is, the information representing the positions and orientations and the number of image capturing apparatuses to be installed when the evaluation value is higher than the threshold.

In step S708, the output unit 205 transmits, to the output device, the placement information of image capturing apparatuses stored in step S706, that is, the information about the positions and orientations and the number of image capturing apparatuses to be installed. The output device visualizes the received placement information of the image capturing apparatuses and presents the visualized information to the user (installer). If unable to obtain the placement information of image capturing apparatuses with the evaluation value higher than the threshold, the output unit 205 notifies this to the user (installer) through transmission to the output device.

The second embodiment makes it possible to output, as placement information, the appropriate number and placement of a plurality of image capturing apparatuses to be installed and used to generate a virtual viewpoint image. Also, by providing the user (installer) with the placement information of image capturing apparatuses, the user can install an appropriate number of image capturing apparatuses in accordance with appropriate placement, without going through a trial-and-error process in determining the placement. This improves efficiency of the installation operation and reduces the time required for the installation operation.

In the present embodiment, the placement information of image capturing apparatuses most desirable for the corresponding number of image capturing apparatuses to be installed is obtained while the number of image capturing apparatuses to be installed is being reduced from the maximum value, so as to determine the placement information of image capturing apparatuses for which the evaluation value is higher than the threshold. However, the method which obtains the optimum number of image capturing apparatuses to be installed, together with others, is not limited to this. For example, the optimum placement information of image capturing apparatuses may be obtained while the number of image capturing apparatuses to be installed is being increased from the minimum value, or the number of image capturing apparatuses to be installed may be included in placement parameters so as to search the placement parameter space for the placement with the highest evaluation value. If the placement information of image capturing apparatuses for which the evaluation value is higher than the threshold cannot be obtained, the placement information with the highest evaluation value may be output.

Third Embodiment

A third embodiment of the present disclosure will now be described. In the third embodiment, description is given regarding an example where the placement information of only some, not all, of image capturing apparatuses is determined and provided to the user (installer). In this case, for example, even when the placement of already installed image capturing apparatuses is to be changed, or even when there are some image capturing apparatuses that cannot be actually installed due to inaccurate environmental information, it is possible to calculate and present the placement information of only some image capturing apparatuses in a short amount of time. It is thus possible to improve efficiency of the installation operation.

The configurations of an information processing apparatus and an installation operation support system according to the third embodiment differ from the configurations of the information processing apparatus and the installation operation support system according to the first embodiment in the following respects, and are otherwise the same as those of the first embodiment. For the configurations of the information processing apparatus and the installation operation support system according to the third embodiment, the description of the same component elements as in the first embodiment will be omitted.

In the information processing apparatus 100 according to the third embodiment, the constraint-information obtaining unit 202 obtains, as constraint information, not only the installable range of image capturing apparatuses and the movement range of virtual viewpoints, but also the placement information of image capturing apparatuses whose placement has already been determined. On the basis of the environmental information and the constraint information, the placement-information obtaining unit 204 calculates the placement of image capturing apparatuses whose placement has not been determined, of a plurality of image capturing apparatuses to be installed.

Information processing will now be described, in which the information processing apparatus 100 of the third embodiment obtains and outputs the placement information of image capturing apparatuses. The information processing performed by the information processing apparatus 100 of the third embodiment is basically the same as the information processing of the first embodiment illustrated in FIG. 4, except that in the third embodiment, the placement information of image capturing apparatuses whose placement has already been determined is fixed and the placement information of the other image capturing apparatuses is obtained.

That is, the environmental-information obtaining unit 201 obtains environmental information in step S401, and the constraint-information obtaining unit 202 obtains constraint information in step S402. As the constraint information, the constraint-information obtaining unit 202 obtains not only the installable range of image capturing apparatuses and the movement range of virtual viewpoints, but also the placement information of image capturing apparatuses whose placement has already been determined.

In step S403, on the basis of the environmental information and the constraint information obtained in steps S401 and S402, the placement-information obtaining unit 204 performs placement information obtaining processing in the same manner as the first embodiment, so as to obtain the placement information of a plurality of image capturing apparatuses (i.e., information about the positions and orientations of image capturing apparatuses to be installed). In the placement information obtaining processing of the third embodiment, the placement-information obtaining unit 204 fixes the placement information of image capturing apparatuses whose placement (obtained as constraint information) has already been determined, and obtains the placement information of the other image capturing apparatuses whose placement has not been determined.

In step S404, the output unit 205 transmits, to an output device, the placement information of image capturing apparatuses whose placement has not been determined (i.e., information about the positions and orientations of the image capturing apparatuses) obtained in step S403. The output device visualizes the received placement information and presents the visualized information to the user (installer).

The third embodiment enables the information processing apparatus 100 to output the placement information of image capturing apparatuses whose placement has not been determined, and thus to obtain the placement information in a short time. Also, by providing the user (installer) with the placement information of image capturing apparatuses, the user can install the image capturing apparatuses in accordance with appropriate placement, without going through a trial-and-error process in determining the placement. This improves efficiency of the installation operation and reduces the time required for the installation operation.

In the present embodiment, the placement information of image capturing apparatuses whose placement has not been determined is obtained, with the placement information of image capturing apparatuses whose placement has already been determined being fixed. However, it is not necessarily required to fix the placement information of image capturing apparatuses whose placement has already been determined. As the constraint information, the placement information of image capturing apparatuses whose placement has already been determined and the range of its variation may be obtained, so that placement information for which the evaluation value is improved within this range of variation is obtained using the parameter searching or optimization technique such as that described above. Thus, even when the environmental information, such as content to be captured or gaze points, or the constraint information changes, it is possible to change the placement of already installed image capturing apparatuses without much trouble.

Fourth Embodiment

A fourth embodiment of the present disclosure will now be described. In the fourth embodiment, description is given regarding an example where image capturing apparatuses to be used to generate a virtual viewpoint image are selected from already-installed image capturing apparatuses, so as to generate a virtual viewpoint image in a short time while maintaining quality. A virtual viewpoint image can be generated faster by reducing the number of image capturing apparatuses to be used to generate the virtual viewpoint image.

The configurations of an information processing apparatus and an installation operation support system according to the fourth embodiment differ from the configurations of the information processing apparatus and the installation operation support system according to the first embodiment in the following respects, and are otherwise the same as those of the first embodiment. For the configurations of the information processing apparatus and the installation operation support system according to the fourth embodiment, the description of the same component elements as in the first embodiment will be omitted.

In the information processing apparatus 100 according to the fourth embodiment, the constraint-information obtaining unit 202 obtains, as constraint information, the installable range of image capturing apparatuses and the movement range of virtual viewpoints. Additionally, the constraint-information obtaining unit 202 obtains, as constraint information, the placement information of image capturing apparatuses whose placement has already been determined, the maximum and minimum values of the number of image capturing apparatuses to be used to generate a virtual viewpoint image, and the threshold of the evaluation value. On the basis of the environmental information and the constraint information, the placement-information obtaining unit 204 selects image capturing apparatuses to be used to generate a virtual viewpoint image. As the placement information, the output unit 205 transmits, to an output device, a list of the image capturing apparatuses selected by the placement-information obtaining unit 204. On the basis of the received list of image capturing apparatuses, the output device sets the image capturing apparatuses to be used to generate a virtual viewpoint image. In the fourth embodiment, the output device 312 is a PC (not shown), not a tablet computer having a wireless communication function.

Information processing performed by the information processing apparatus 100 according to the fourth embodiment will now be described. The flow of the information processing performed by the information processing apparatus 100 according to the fourth embodiment is the same as that of the information processing of the second embodiment illustrated in FIG. 7. Only differences from the second embodiment will be described herein.

In step S702, the constraint-information obtaining unit 202 obtains, as constraint information, the installable range of image capturing apparatuses, the movement range of virtual viewpoints, the placement information of image capturing apparatuses whose placement has already been determined, the maximum and minimum values of the number of image capturing apparatuses to be used to generate a virtual viewpoint image, and the threshold of the evaluation value.

In step S703, the placement-information obtaining unit 204 sets the number of image capturing apparatuses to be used to generate a virtual viewpoint image to the maximum value obtained in step S702, and executes the processing in steps S703 to S707. The placement-information obtaining unit 204 then repeats the processing in steps S703 to S707 while reducing the number of image capturing apparatuses in decrements of one, from the maximum to minimum values obtained in step S702, in every execution of the processing in steps S703 to S707.

In step S704, on the basis of the environmental information and the constraint information obtained in steps S701 and S702, the placement-information obtaining unit 204 selects image capturing apparatuses to be used to generate a virtual viewpoint image, and then calculates an evaluation value in the selected state.

In step S705, the placement-information obtaining unit 204 determines whether the evaluation value calculated in step S704 is lower than or equal to the threshold of the evaluation value obtained in step S702. If the placement-information obtaining unit 204 determines that the calculated evaluation value is lower than or equal to the threshold, the process exits the repetition and proceeds to step S708, whereas if the placement-information obtaining unit 204 determines that the calculated evaluation value is higher than the threshold, the process proceeds to step S706.

In step S706, as placement information of image capturing apparatuses, the placement-information obtaining unit 204 stores the list of selected image capturing apparatuses. Therefore, the placement information of image capturing apparatuses to be output when the process proceeds from step S705 to step S708 is one that has been stored in the previous iteration of the loop, that is, the list of image capturing apparatuses selected when the evaluation value is higher than the threshold.

In step S708, the output unit 205 transmits, to the output device, the placement information of image capturing apparatuses stored in step S706, that is, the list of selected image capturing apparatuses. On the basis of the received placement information of image capturing apparatuses (i.e., list of image capturing apparatuses), the output device sets the image capturing apparatuses to be used to generate a virtual viewpoint image. If unable to select the list of image capturing apparatuses with the evaluation value higher than the threshold, the output unit 205 notifies this to the user (installer) through transmission to the output device. The list of image capturing apparatuses to be used, output by the output unit 205, may be set in a virtual viewpoint image generating system or three-dimensional reconstruction system, so as to generate a virtual viewpoint image or three-dimensional model using the set image capturing apparatuses.

The processing in step S704 according to the fourth embodiment will now be described. The flow of the processing in step S704 according to the fourth embodiment is the same as the processing of the first embodiment illustrated in FIG. 5, and only differences from the first embodiment will be described. Note that in the fourth embodiment, the processing in step S501 to S505 is repeated once.

In step S502, the placement-information obtaining unit 204 generates a plurality of placement candidates for image capturing apparatuses. Specifically, the placement-information obtaining unit 204 generates, as placement candidates, all combinations of image capturing apparatuses when as many image capturing apparatuses as the number of image capturing apparatuses set in step S703 are selected from the image capturing apparatuses whose placement has already been determined and for which the placement information has been obtained in step S702. In step S506, the placement-information obtaining unit 204 returns, as the placement information of image capturing apparatuses, the placement candidate with the highest evaluation value stored in step S504 and the evaluation value.

In the fourth embodiment, the information processing apparatus 100 automatically selects image capturing apparatuses necessary and sufficient for generating a virtual viewpoint image while ensuring image quality. This eliminates the need for trial and error in determining image capturing apparatuses to be used to generate a high-quality virtual viewpoint image at high speed, and reduces the time required for setting operation in image generation.

The application of the present embodiment is not limited to selecting image capturing apparatuses to be used from those already installed for quickly generating a virtual viewpoint image while maintaining the quality. The present embodiment may be used, for example, to reduce the number of image capturing apparatuses already installed. In this case, the output unit 205 may output a list of image capturing apparatuses that have not been selected.

If image capturing apparatuses are already installed, the environmental-information obtaining unit 201 may obtain actually captured images of an object as environmental information, and the evaluating unit 203 may evaluate the placement of image capturing apparatuses using the actual images, instead of simulation images. For example, as described above, the evaluation value may be determined by comparison with a generated image or three-dimensional shape in the preceding frame. Alternatively, an image from an image capturing apparatus that has not been selected may be used as a correct image, and the evaluation value may be calculated by comparing the correct image with a virtual viewpoint image reproducing the view from the image capturing apparatus that has not been selected.

The number of image capturing apparatuses to be used to generate a virtual viewpoint image may be determined while the maximum value obtained as constraint information is being reduced, or may be determined while the minimum value obtained as constraint information is being increased. The number of image capturing apparatuses may be included in the combinations of placement candidates so as to generate all combinations as placement candidates, or a combination randomly selected from all the combinations may be used as a placement candidate. Selection of image capturing apparatuses may be made by using a known technique, such as a parameter searching or optimization technique. If placement information with an evaluation value higher than the threshold cannot be obtained, the placement information with the highest evaluation value may be output.

The embodiments described above are all merely examples for carrying out the present disclosure, and the technical scope of the present disclosure should not be interpreted in a limited sense by the embodiments described above. That is, the present disclosure can be implemented in various forms without departing from the technical scope or main features thereof.

By virtue of the present embodiment, it is possible to output appropriate placement information of a plurality of image capturing apparatuses to be used to generate a virtual viewpoint image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
obtain constraint information representing constraints in placing a plurality of image capturing apparatuses that capture images for generating a virtual viewpoint image, the constraint information including a range in which image capturing apparatuses can be placed;
generate, based on obtained constraint information, placement information relating to placement of the plurality of image capturing apparatuses; and
output the generated placement information.

2. The information processing apparatus according to claim 1, wherein the placement of the plurality of image capturing apparatuses is evaluated by evaluating quality of the virtual viewpoint image generated from the images captured by the plurality of image capturing apparatuses.

3. The information processing apparatus according to claim 1, wherein the placement of the plurality of image capturing apparatuses is evaluated by evaluating accuracy of a three-dimensional shape generated from the images captured by the plurality of image capturing apparatuses.

4. The information processing apparatus according to claim 1, wherein the placement information includes information representing a position and orientation of each image capturing apparatus or a position and orientation of each image capturing apparatus and the number of image capturing apparatuses to be placed.

5. The information processing apparatus according to claim 1, wherein, in accordance with evaluation on a plurality of placement candidates generated for the plurality of image capturing apparatuses, one of the generated placement candidates is output as placement information relating to placement of the plurality of image capturing apparatuses.

6. The information processing apparatus according to claim 5, wherein the placement of the plurality of image capturing apparatuses is evaluated based on an evaluation value for each placement candidate by comparing a virtual viewpoint image and a simulation image captured from the virtual viewpoints, the virtual viewpoint image being generated using simulation images simulating images captured by the plurality of image capturing apparatuses placed in accordance with the placement candidate.

7. The information processing apparatus according to claim 5, wherein the placement of the plurality of image capturing apparatuses is evaluated based on an evaluation value for each placement candidate by comparing a three-dimensional shape generated from simulation images simulating images captured by the plurality of image capturing apparatuses placed in accordance with the placement candidate and a three-dimensional shape used in simulation.

8. The information processing apparatus according to claim 1, wherein the constraint information includes placement information of image capturing apparatuses whose placement has been determined.

9. The information processing apparatus according to claim 8, wherein the placement information is generated by calculating placement of some of the plurality of image capturing apparatuses, based on the placement information of image capturing apparatuses whose placement has been determined.

10. The information processing apparatus according to claim 8, wherein image capturing apparatuses to be used to generate a virtual viewpoint image is selected based on the placement information of image capturing apparatuses whose placement has been determined.

11. An information processing apparatus comprising:
one or more memories storing instructions; and
one or more processors executing the instructions to:
obtain constraint information representing constraints in placing a plurality of image capturing apparatuses that capture images for generating a virtual viewpoint image;
obtain environmental information relating to three-dimensional information or motion information of an object to be captured by the plurality of image capturing apparatuses,
generate, based on the obtained environmental information and the obtained constraint-information, placement information relating to placement of the plurality of image capturing apparatuses; and
output the generated placement information.

12. The information processing apparatus according to claim 11, wherein the environmental information includes three-dimensional information of a static object and three-dimensional information and motion information of a dynamic object.

13. An information processing apparatus according to claim 1, comprising:
one or more memories storing instructions; and
one or more processors executing the instructions to:
obtain constraint information representing constraints in placing a plurality of image capturing apparatuses that capture images for generating a virtual viewpoint image;
generate, based on obtained constraint information, placement information relating to placement of the plurality of image capturing apparatuses;
evaluate the placement information of the plurality of image capturing apparatuses; and
output, based on an evaluation of the placement of the plurality of image capturing apparatuses, placement information relating to placement of the plurality of image capturing apparatuses.

14. An information processing apparatus comprising:
one or more memories storing instructions; and
one or more processors executing the instructions to:
obtain constraint information representing constraints in placing a plurality of image capturing apparatuses that capture images for generating a virtual viewpoint image, the constraint information including a movement range of virtual viewpoints for a virtual viewpoint image;

generate, based on the obtained constraint information, placement information relating to placement of the plurality of image capturing apparatuses; and output the generated placement information.

15. An information processing apparatus comprising:

one or more memories storing instructions; and one or more processors executing the instructions to:

obtain constraint information representing constraints in placing a plurality of image capturing apparatuses that capture images for generating a virtual viewpoint image, the constraint information including the number of image capturing apparatuses to be placed;

generate, based on the obtained constraint information, placement information relating to placement of the plurality of image capturing apparatuses; and output the generated placement information.

16. An information processing method executed by an information processing apparatus, the information processing method comprising:

obtaining constraint information representing constraints in placing a plurality of image capturing apparatuses that capture images for generating a virtual viewpoint image, the constraint information including a range in which image capturing apparatuses can be placed;

generating, based on obtained constraint information, placement information relating to placement of the plurality of image capturing apparatuses; and outputting the generated placement information.

17. A non-transitory computer-readable storage medium storing a computer program for causing a computer to execute an information processing method, the method comprising:

obtaining constraint information representing constraints in placing a plurality of image capturing apparatuses that capture images for generating a virtual viewpoint image, the constraint information including a range in which image capturing apparatuses can be placed;

generating, based on obtained constraint information, placement information relating to placement of the plurality of image capturing apparatuses; and outputting the generated placement information.

* * * * *